Sept. 3, 1946.   G. W. ASHLOCK, JR   2,407,126
METHOD OF PITTING FRUIT
Filed Sept. 24, 1945   3 Sheets-Sheet 1
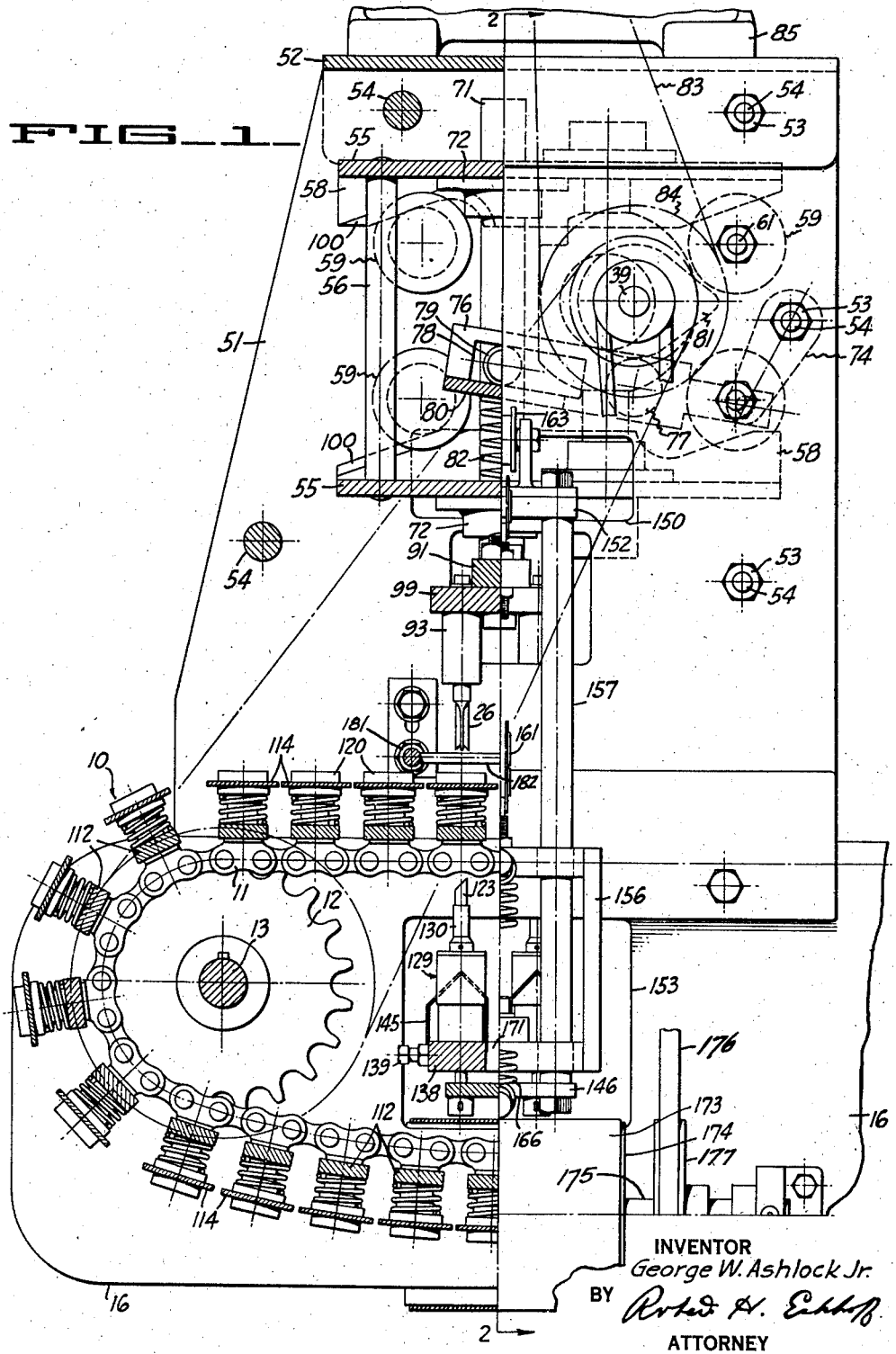
FIG_1
INVENTOR
George W. Ashlock Jr.
BY
ATTORNEY

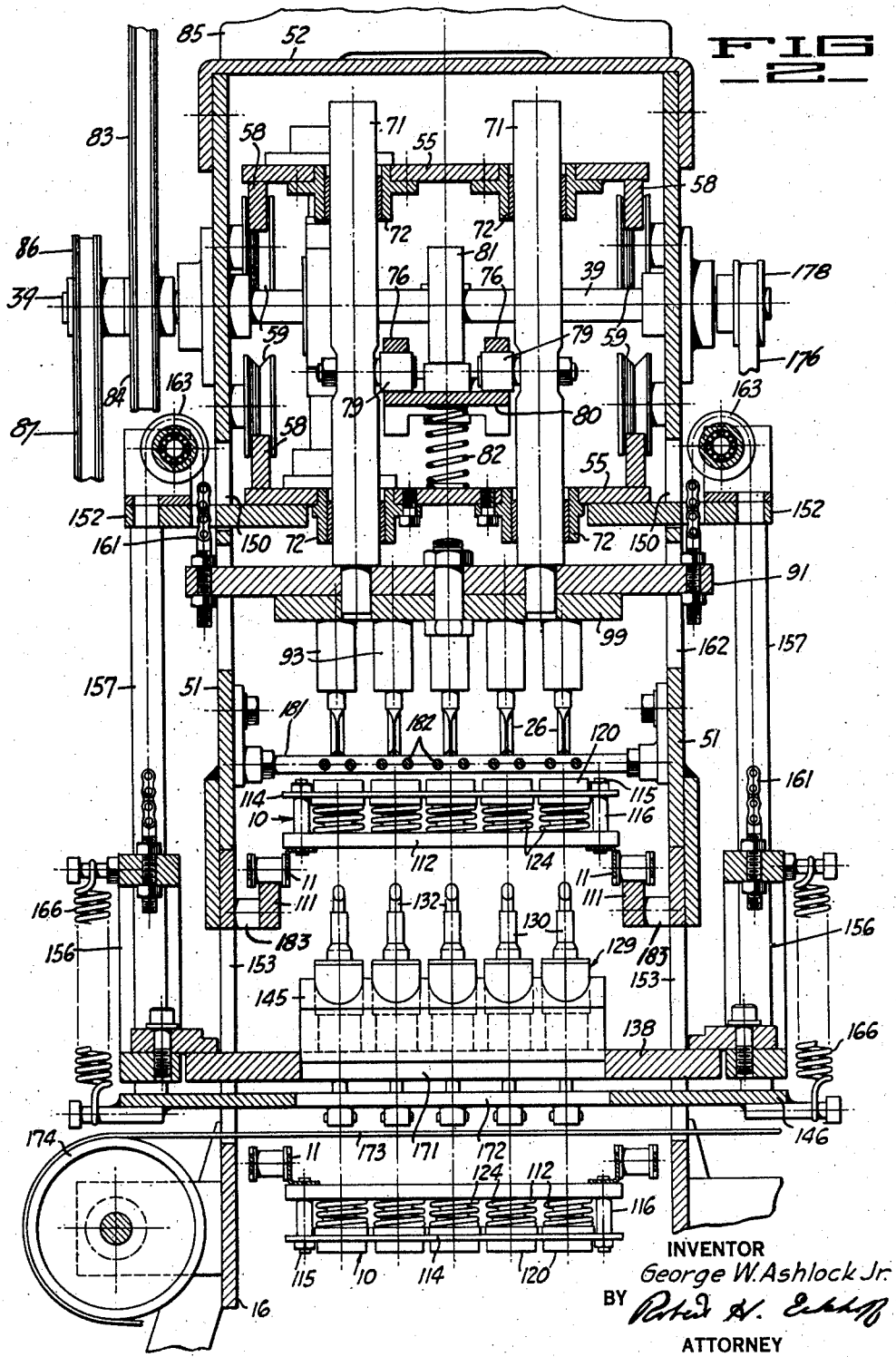

Sept. 3, 1946. G. W. ASHLOCK, JR 2,407,126
METHOD OF PITTING FRUIT
Filed Sept. 24, 1945 3 Sheets-Sheet 3
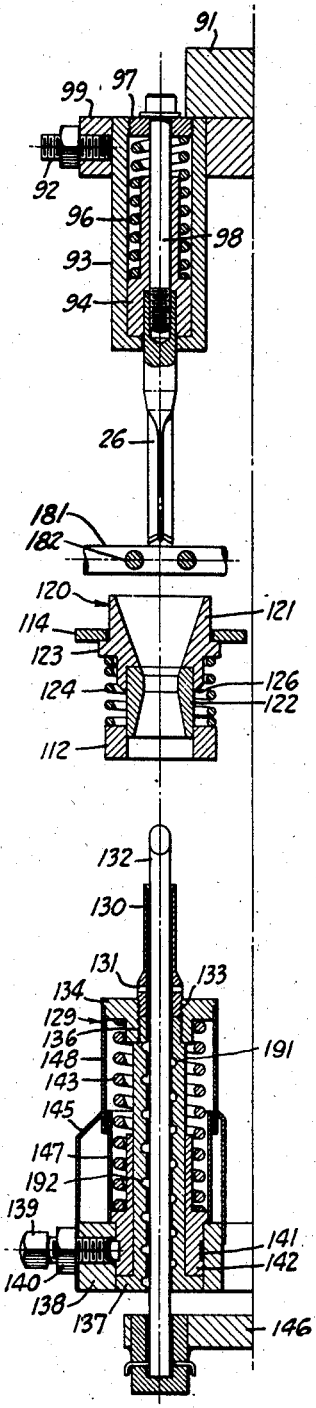
FIG_3_
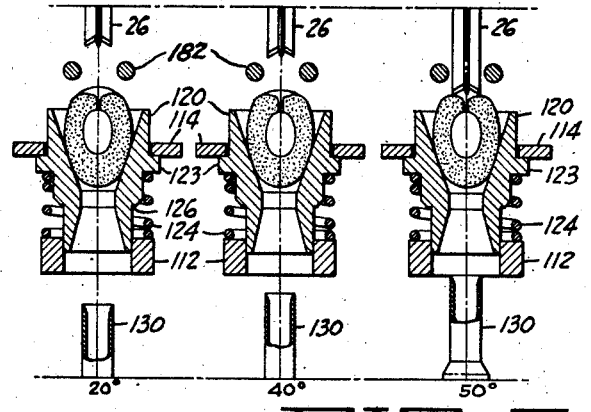
FIG_4_
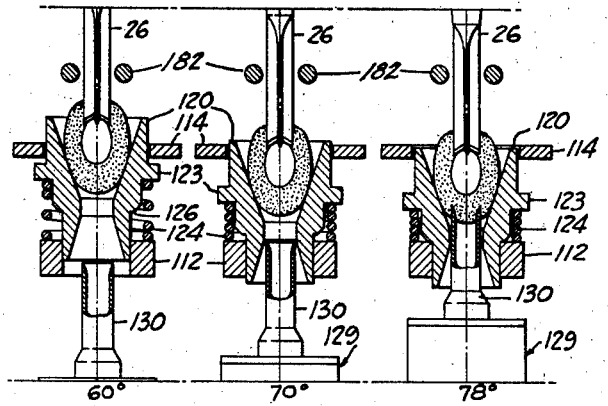
FIG_5_
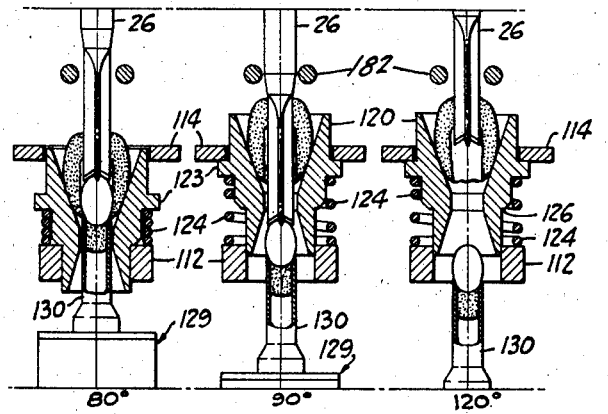
FIG_6_
INVENTOR
George W. Ashlock Jr.
BY
ATTORNEY Patented Sept. 3, 1946

2,407,126

UNITED STATES PATENT OFFICE 2,407,126

METHOD OF PITTING FRUIT

George W. Ashlock, Jr., Oakland, Calif.

Application September 24, 1945, Serial No. 618,249

2 Claims. (Cl. 146—238)

This invention relates to fruit pitting methods and particularly to one adapted to the pitting of drupaceous fruits such as olives, plums, prunes, dates and the like. However, it is not limited in application to these, for it can be successfully employed upon any article having a substantially central stone or pit surrounded by an outer flesh portion. The method of the present invention has proven particularly useful upon olives and it will therefore be described in this connection. However, it is to be understood that the method may be employed on other like fruits or articles.

In my Patent 2,271,675 of February 3, 1942, I disclosed a machine for continuously and automatically pitting articles of the class described. This machine has met with widespread commercial success. However, referring to that patent and particularly to Figures 2, 3 and 4 thereof, it will be observed that the stone was removed from the fruit along the longitudinal axis of the fruit in conjunction with a portion of the fruit slightly larger than the stone in cross-section. This was achieved by cutting a core in one side of the fruit with a tubular knife, in axial alignment with the stone, then moving the stone and the attached core into the tubular coring knife which is then withdrawn to remove the stone and core. Inasmuch as the stone was passed through the coring knife without crushing or splintering, it was desirable that the knife be of a size slightly larger than the stone to be removed. Now the usual practice is to grade fruit into different sizes and to then handle a fruit of only one or two sizes on a machine. When it was desired to handle other sizes of fruit, it was necessary to change the coring knives. This requires various sets of knives and their substitution for one another. Also the machine must be inoperative during that period of time while the change is being made. Also, because the core cut in the fruit was of a size at least as large as the stone, a fairly sizable opening was made in one side of the fruit. This cut away a considerable portion of the edible fruit.

It is in general the broad object of the present invention to provide a method of pitting fruit which can be successfully applied to various grades of fruit without changing the coring knives.

Another object of the present invention is to provide a pitting method which can be utilized on various sizes of a fruit.

A further object of the present invention is to provide a novel pitting method.

A still further object of the invention is to provide a pitting method wherein the stone is caused to come to rest upon the cutting edge of the coring knife which serves as a support for the stone, thus enabling a materially smaller core to be cut in the fruit prior to ejection of the stone. This enables a relatively small core to be cut whereby less of the fruit is cut away and lost.

In accordance with this invention, I support the fruit by confining the sides in a supporting engagement. Then I pass a plunger into the fruit from the top and press on the pit, forcing the fruit more firmly against the support. Then I core the fruit by inserting a coring knife in axial alignment with the plunger to engage the opposite side of the pit and join the pit between the two. Then I slide the fruit axially along the plunger to break the pit loose. Then I move the plunger and knife in the same direction with the pit jammed between them until the pit is free of the fruit. The coring knife is made so small that it will always seat on the pit.

The invention includes other objects and features of advantage, some of which, together with the foregoing, will appear hereinafter wherein a form of machine is disclosed suited to carrying out the method of this invention.

In the drawings accompanying and forming a part hereof,

Figure 1 is a side elevation partly in section through a machine embodying the present invention.

Figure 2 is a section taken along the line 2—2 of Figure 1, and illustrating the machine construction in transverse section.

Figure 3 is a side elevation, partly in section, showing the relative position at one point in the operation of the pitting knife, the chuck for supporting the fruit, the coring knife and the pit ejector.

Figures 4, 5 and 6 are a series of views illustrating the relative position of the pitting knife, a fruit positioned in a supporting chuck, and the coring knife during the coring, pitting and stone removing operation.

The machine includes a conveyor for delivering the fruit to a pitting station. The fruit is generally delivered to the pitting station in a predetermined position and for this the straightening mechanism as shown in my Patent 2,250,518 of July 29, 1941, may be used advantageously. The conveyor construction employed and its relation to the pitting mechanism is generally shown in that patent and in my previously mentioned Patent 2,271,675. The pitting plunger mechanism is shown particularly in my Patent 2,219,832 of October 29, 1940.

Referring to Patent 2,219,832, and particularly to Figures 1 and 2 in the accompanying drawings herein, a carrier structure, generally indicated at 10, is movable past a presently described pitting mechanism. The machine also includes a suitable frame generally indicated at 16; the structure of the frame and of the carrier structure in relation thereto is fully disclosed in the aforementioned patents. The carrier includes a conveyor chain 11 passing over sprockets 12 supported upon shafts 13 suitably journaled in the frame of the machine at each end thereof.

The pitting mechanism employed is that disclosed in my Patent 2,219,832. This includes opposite parallel vertically extending side members 51 supported on frame 16 and joined together by the member 52 and threaded rods 54 extending through each side member 51 and secured thereto by nut 53. Between the side plates is a pitting knife or plunger head structure which includes horizontal parallel plates 55 secured together in a spaced relation by spacers 56. Each plate 55 carries V-block 58 on opposite sides thereof and having angularly formed V-sections 100 on which roll the V-rollers 59. A stud 61 supports each roller on a side member 51. The V-blocks and V-rollers thus support the head structure provided by plates 55 for a reciprocating movement over the plane of the carrier structure 10 and, at the same time, for an up-and-down movement, so that the head structure moves toward and away from the horizontal plane of the carrier structure 10.

Means are provided on the head structure for operating a pitting or plunger mechanism. This includes the plungers 71 suitably journaled in bearings 72 on plates 55. Fixed arms 74 are mounted upon one of the rods 54 and extend to provide a support for the spaced levers 76 between which is mounted a cam follower 77. The extending end of each lever 76 is slotted as at 78 to engage a roller 79 carried upon each plunger 71. The cam follower 77 is maintained in engagement with a cam 81 carried on shaft 39 by a spring 82 pushing on pad 80 joining the levers 76. The spring urges the levers 76 clockwise in Figure 1 so that the cam follower engages the cam at all times. The shaft 39 is driven by a suitable chain 83 passed over a sprocket 84 to a suitable prime mover 85 mounted on member 52. Another sprocket 86 is provided on shaft 39 and a chain 87 is passed over it and about a sprocket (not shown) on shaft 13 to drive the conveyor.

A plate 91 is mounted upon the extending ends of the plungers 71 and extends transversely across the machine. It carries a plate 99 which supports a plurality of fruit cutting knives or plungers indicated generally at 26. These knives can be arranged in one or more rows across the plate 99 and in the machine illustrated two rows are employed. The construction of the knives is shown in Figure 3.

Each knife is provided as a sub-assembly retained in place in the plate by stud 92 which engages cylinder 93. A plunger 94 carries the knife 26 for a reciprocating movement against the bias of spring 96. A plate 97 is screwed into the end of the cylinder to retain the spring in place and to serve as a guide for the rod 98 which extends through plate 97 and is screwed into the knife 26 to retain it in place, in the plunger 94. A broken knife is quickly replaced by holding knife 26 and rotating the rod 98 to release the knife.

I have previously mentioned that the fruit carrier structure 10 included spaced conveyor chains 11 passed over sprockets 12 at each end of the frame of the machine. Intermediate these sprockets the upper run of the conveyor provides a horizontal conveyor section, the conveyor chains 11 being supported by suitable tracks or supports 111 provided on each side of the frame, as appears in Figure 2. A plurality of supporting plates 112 are mounted between corresponding links in the conveyor chains. A second plate 114 is retained in a spaced relation with respect to plate 112 by studs 115 and spacers 116. Supported for a sliding movement in suitable apertures in each of the plates are a plurality of fruit holders generally indicated at 120.

As appears particularly in Figure 3, each fruit holder comprises two elements, an upper element 121 and a lower or guide element 122. The upper element is preferably formed with a suitable interior configuration enabling the article to be stoned to be positioned in a desired alignment. A suitable configuration is that taught in my Patent 2,250,518 wherein the fruit receiving cavity is formed as an inverted truncated cone with opposite cavity walls substantially at an angle of from 32° to 44°. The upper portion 121 is formed with a shoulder 123 thereon, the upper face engaging the lower side of plate 114 and the lower face serving as a support for a spring 124 which rests upon plate 112 and retains the receptacle against the under side of plate 114 except when it is caused to move downwardly, the spring being compressed until shoulder 126 engages plate 112. The lower or guide portion 122 is suitably joined to portion 121 and is formed with a suitable opening therein to permit entrance of the coring knife and release of the stone and its associated core as will presently appear.

The coring knife structure comprises a sub-assembly 129 including a hollow tubular knife generally indicated at 130 and having a passage 131 adjacent its base to permit the entrance of air so that any solid material in the coring knife can be readily ejected by the ejector 132. The coring knife is threaded as at 133 into a member 134 which is also positioned on threaded end 136 of guide 137.

A plurality of coring knife sub-assemblies are mounted in plate structure 138 which extends across the machine. Each of the coring knife sub-assemblies 129 are retained in apertures in the plate 138 by a stud 139 and lock nut 140, the stud engaging slot 141 in a base or support 142 for the knife assembly. Support 142 also provides a bearing support for guide 137. A spring 143 is positioned between member 134 and support 142 to provide for a resilient mounting of the coring knife. The pit ejector 132 is supported in the base structure generally indicated at 146. Each ejector extends through the pitting knife to eject material in the knife, as will be presently described. Suitable light sheetmetal covers 145, 147 and 148 are provided about each pitting knife assembly to protect it against entrance of foreign material.

The coring knives and pit ejectors are moved by the following structure. The machine side frame plates 51 are suitably apertured as at 150 to pass extension plates 152 secured to the lower plate 55 and which extend to the outside of the machine. Frame members 16 are also apertured as at 153 to permit plate 138 and base 146 to be positioned and to extend across the machine. Two rods 157 are secured on each side of the machine to plates 152. At their lower ends these rods are joined to base 146. Plate 138 is removably mounted in a frame 156 which is mounted for sliding on the rods 157. It will be apparent that the coring knives and the ejectors follow the movement of the pitting head plate 55 and move with this plate at the same rate of advance with the conveyor, since they are formed as an extension on the pitting head plate 55.

To provide for movement of the coring knives, chains 161 are secured to each side of plates 91 and are then passed over guide pulleys 163 and depend downwardly to the coring knife reciprocating frame 156 which is mounted for a reciprocating movement on the guide rods 157. Springs 166, positioned between frame 156 and the base plate 146 place a tension on the chains 161 and ensure that these remain taut.

The pitting plungers and the coring knives are moved by the pitting head over the same path. However, when the knives are lowered by plungers 17, chains 161 raise the coring knives so the two approach each other until, in the absence of a fruit, they are practically in contact. With the fruit pit between, one or both of the spring mounts is compressed to hold the fruit pit securely. The core ejectors, however, are only moved by the pitting head so the coring knives reciprocate on these and the relative movement thus provided is effective to eject any core retained in the tubular knives.

To permit of ready removal of the ejected stones and associated cores the plates 138 and 146 are each apertured as at 171 and 172, as appears in Figure 2, so that the stones and cores can fall onto suitably driven transverse conveyor belt 173 supported by suitable rollers 174 on each side of the machine, whereby the stones and cores are removed.

One of the rollers is mounted on a shaft 175 on one side of the machine. A V-belt 176 is trained about a pulley 177 on this shaft and a pulley 178 on shaft 39.

To strip any meat adhering to the plungers 26, a stripper is provided made up of rods 181 which extend transversely of the machine and carry stripper plates 182 on each side of a knife.

The operation of the machine and the method of this invention will become further apparent upon considering the following sequence of operation, particularly in connection with Figures 3, 4, 5 and 6.

The description will be made as the machine is operated continuously. However, it is to be understood that it can be operated sequentially if desired, that is, instead of moving the pitting, coring mechanism and the conveyor structure 10 continuously, the conveyor structure 10 can be moved to a pitting and coring position and brought to rest, the stoning, coring and pit-removing mechanisms operated, whereupon the conveyor mechanism is advanced. However, this sequential operation is not nearly so fast and continuous operation is usually greatly preferred.

It being understand that shaft 39 is rotated at a suitable speed, and that conveyor 10 is being operated in a timed relationship therewith, and that each receptacle 120 contains fruit in alignment, the fruit is advanced to the fruit pitting and coring station as appears in Figure 1. It will be noted that below each of the views in Figures 4, 5 and 6 has been placed a degree value. This indicates the relative position of the various parts shown following movement of shaft 39 through the indicated number of degrees from a zero position, that wherein the coring knife and the pitting plunger are practically fully retracted. Referring to these figures, it will be noted that in Figure 4 the pitting plunger and the coring knife are shown approaching the fruit in the receptacle 120 but that the fruit has not been cut by either. In Figure 5, it will be observed that the pitting plunger first engages the fruit after about 60° of rotation of shaft 39, entering the fruit and engaging the stone to compress spring 124 and force the receptacle 120 down until shoulder 126 engages the lower plate 112 to force the fruit into engagement with the coring knife and cut a core in the fruit after about 78° of rotation. The cutting of the core in the particular machine disclosed is effected by movement of the receptacle 120 and movement of the coring knife. This enables the travel of the coring knife and of the receptacle to be kept to a minimum; because the spring 124 regulates the amount of pressure which can be placed upon the fruit it ensures that the portion of the fruit engaged with the sides of the receptacle is not bruised or otherwise harmed.

The coring knife can be made stationary and the plunger can force the fruit and receptacle down to it. However, this involves more travel for the plunger and receptacle.

Referring now to Figure 6, it will be observed that a core has been cut and that the pitting plunger is retaining the stone in engagement on the tubular coring knife. The fruit supported in receptacle 120 is now free to slide along the pitting plunger, but to do this the core and stone must slip through the end of the fruit. This appears in the last view in Figure 6, which illustrates how the pitting plunger and coring knife retract, the latter carrying the stone on its end for subsequent removal by the plunger 132. At the instant that the pit or stone breaks loose, after the core is cut, the bias of spring 124 forces the receptacle and fruit upwardly with a snap. The position of the fruit and receptacle in the 90° view of Figure 6 is attained almost instantaneously after the pit breaks loose.

The views shown cover the period from 20° of movement of the shaft 39 to 120°. The remaining circular movement, that is, from 120° through zero and to 20°, covers the remaining cycle of operation, the only feature of which is the retraction of the coring knife on the pit removing plunger 132 to such an extent that the core and stone are ejected if they happen to be still retained in place under the coring knife. The several views of Figures 4, 5 and 6 are illustrative only and one need not employ the exact timing which I have shown.

From the foregoing I believe it will be apparent that I have provided a method which enables a fruit to be pitted with a minimum flesh removal. In practice I am able to increase by a material extent the quantity of fruit which is secured from the pitting operation. In other words, if one took two like masses of fruit and pitted one mass of the same weight on my previous pitting machine, and pitting an equal mass in accordance with the present invention, the latter mass will exceed the weight of the former mass by several per cent, indicating the greater retention in the quantity of the fruit as a result of the pitting operation conducted in accordance with this invention.

In some cases also it is desirable to rotate the coring knives as they are raised to cut the core, during coring and retraction. If the knives are vibrated or rotated a serrated cutting edge is advantageous. The coring knives are rotated by providing a projecting pin 191 on the side of pit ejector 132 and which extends into a spiral cut slot 192 in the member 137 of the coring knife sub-assembly 129. In this case, the stud 139 is in engagement with slot 141 only to an extent sufficient to retain the sub-assembly and permit it to rotate freely in plate 138.

This application is a continuation in part of my application Serial Number 528,871, filed March 31, 1944.

I claim:

1. A method of removing a pit from a fruit comprising engaging the sides of said fruit, which has been oriented with the long axis of the pit in substantial alignment with a plunger and coring knife, in a resilient supporting zone providing a confining engagement of said fruit, inserting a plunger through an end of said supported fruit to engage and press upon the end of the pit therein, inserting a hollow coring knife into the fruit in axial alignment with the plunger until the knife engages the end of the pit opposite that engaged by the plunger and the core is within the knife, said knife being smaller in diameter than the pit with the pit seating on the knife edge, the core thereby maintaining the alignment of the pit on the knife edge, then sliding the fruit along the plunger to break the pit loose, while said pit is engaged at its opposing ends, and moving the plunger and knife in axial alignment and in the same direction through the fruit with the pit jammed therebetween to remove the pit through the cored fruit and out the end thereof substantially without crushing damage to the cored end of the fruit, removing the fruit supporting zone together with the fruit away from the pit substantially simultaneously with the ejection of the pit from the fruit, and retracting the knife and the pit supported thereby from said supporting zone.

2. A method of removing a pit from a fruit comprising engaging the sides of a fruit, which has been oriented with the long axis of the pit in substantial alignment with a plunger and coring knife, in a confining and a slidable supporting engagement, inserting a plunger through the top of the confined and supported fruit to engage the pit in the fruit, moving the plunger while in engagement with the pit to move the supported fruit in axial alignment with the plunger and to apply a constant force to the pit urging the pit toward the bottom of the fruit, inserting a hollow tubular coring knife into the bottom of the fruit in axial alignment with the plunger to cut a core in the fruit extending into the fruit to adjacent the pit, said knife being smaller in diameter than the pit so that the pit seats on the edge of the hollow tubular knife with the core projecting into the knife and with the pit jammed between the knife edge and the plunger, then moving the plunger and the knife in the same direction and toward the bottom of the fruit with the pin jammed between the knife and the plunger until the reaction to the force applied to the supported fruit by the plunger moves the fruit axially along the plunger until the pit and its attached core are carried out of the fruit substantially without crushing damage to the cored end of the fruit, further retracting the hollow knife until it is away from the fruit and then ejecting the core from the knife.

GEORGE W. ASHLOCK, Jr.